United States Patent [19]

Dalby

[11] Patent Number: 4,753,465
[45] Date of Patent: Jun. 28, 1988

[54] REMOTELY OPERABLE LOCKING MECHANISM

[75] Inventor: James F. Dalby, 11704 Indian Ridge Rd., Reston, Va. 22091

[73] Assignee: James F. Dalby, Reston, Va.

[21] Appl. No.: 850,454

[22] Filed: Apr. 11, 1986

[51] Int. Cl.[4] .......................... E05C 1/02; E05C 9/04
[52] U.S. Cl. ...................................... 292/32; 292/137; 292/138; 292/156; 292/DIG. 66
[58] Field of Search .................... 148/402; 292/32, 42, 292/DIG. 66, 144, 33, 252, 177, 156, 137

[56] References Cited

U.S. PATENT DOCUMENTS

| | | |
|---|---|---|
| 778,469 | 12/1904 | Uhri .................................... 292/177 |
| 1,007,568 | 10/1911 | Hollar . |
| 1,183,490 | 5/1916 | Pollgreen ............................ 292/32 |
| 1,483,541 | 2/1924 | Basart . |
| 2,767,011 | 10/1956 | Buckley .............................. 292/144 |
| 3,664,698 | 5/1972 | Stropkay . |
| 3,801,954 | 4/1974 | Dorrell . |
| 3,806,910 | 4/1974 | Keifer et al. . |
| 3,999,790 | 12/1976 | Rogen ......................... 292/DIG. 66 |
| 4,010,455 | 3/1977 | Stange . |
| 4,030,298 | 6/1977 | Sandoval . |
| 4,055,955 | 11/1977 | Johnson . |
| 4,075,846 | 2/1978 | Li . |
| 4,111,474 | 9/1978 | Heydner . |
| 4,200,954 | 5/1980 | McCabe . |
| 4,539,929 | 9/1985 | Sestak et al. ................ 292/DIG. 66 |

Primary Examiner—William F. Pate, III
Assistant Examiner—Michael Safavi
Attorney, Agent, or Firm—Pollock, Vande Sande & Priddy

[57] ABSTRACT

A locking mechanism for securing together two separable pieces, such as two components of a spacecraft during launch. An elongated rod of heat contractible material provides a single active member which changes from a locking length to a contracted length upon application of sufficient heat to raise the temperature of the rod from below to above its transition temperature. Mounting and housing structures are provided for mounting and heating this transducer rod and an apertured member or recessed stop is provided for engaging a projecting portion thereof. Heating may be provided by redundant, electrically actuated heating coils surrounding a major portion of the rod length. At least a major portion of the transducer rod may be made of 55-Nitinol.

20 Claims, 3 Drawing Sheets

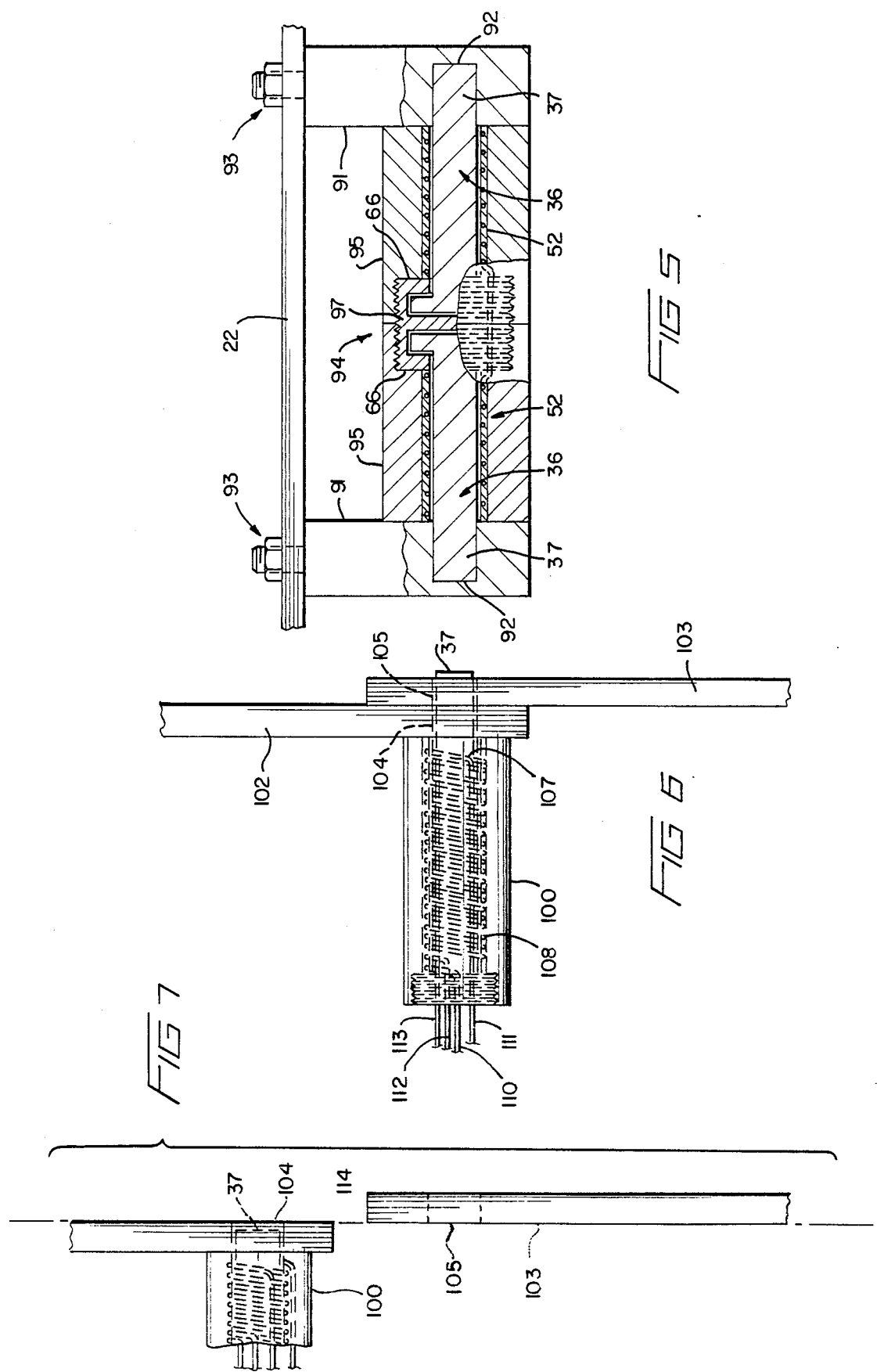

REMOTELY OPERABLE LOCKING MECHANISM

TECHNICAL FIELD

The present invention generally relates to locking mechanisms which may be actuated remotely to release two or more separable pieces. More particularly, the invention provides a launch lock having a linear actuator made of a heat contractible material such as 55-Nitinol.

BACKGROUND OF THE INVENTION

The numerous forces and stresses imparted to both the interior and exterior components of a space craft by its launch vehicle must be load-pathed carefully throughout the structure to preclude damaging the payload components carried by the spacecraft. These payload components often may be of more delicate construction than either the launch vehicle or the spacecraft itself. The space shuttle as a launch vehicle imposes a variety of primarily transverse and random forces on its payload, whereas expendable launch vehicles impose primarily longitudinal and random forces on the spacecrafts to which they are detachably connected.

In the past, load-paths have been provided through the components within the spacecraft by a system of "launch locks" which temporarily connect these components together via a plurality of metal shafts and interconnected pieces which must later be disconnected so as to move with respect to each other. After the stresses of a launch are over, the metal shafts of the "launch-locks" must be severed mechanically to permit the previously connected spacecraft components to move relative to each other as required for accomplishment of the tasks for which designed. Prior art techniques for disengaging the shaft of the launch locks may prove unreliable because they involve severing a relatively heavy metal bolt with a relatively heavy bolt cutter. These prior art bolt cutting devices are relatively complicated and heavy because the bolt cutting assembly generally includes a bolt catcher and a pyrotechnic actuator for driving a single or redundant cutter through a metal shaft of relatively large diameter. Due to variations in the shear resistance of the metal shaft and the driving force of the pyrotechnical device, the bolt cutter may fail to sever the metal shaft of the launch lock, leaving connected component parts of the spacecraft that need to be freed for relative movement in order to properly carry out the mission of the spacecraft and its payload.

It also is known that bi-metallic elements, such as those used in thermostatic controls and the like, may cause movement within a latch or release mechanism. Such thermostatically actuated release mechanisms may be used to actuate various types of fire protection equipment in response to an increase in heat in the vicinity of the bi-metallic element. However, such conventional actuating and releasing devices employing bi-metals have the disadvantage of generating only low levels of movement force. Accordingly, bi-metallic elements generally are not capable of generating the high levels of tension needed to withdraw a heavy metal shaft from binding engagement with separable pieces of a spacecraft. Even highly tensioned springs as may be used in conventional bolt cutter assemblies sometimes fail to overcome the level of binding friction occurring between two separable pieces held together by the shaft of a launch lock.

DISCLOSURE OF THE INVENTION

The present invention performs basically the same function as a conventional launch lock employing a heavy gauge bolt, a bolt cutter, a bolt catcher and a highly tensioned spring for freeing a severed portion of the bolt from the pieces which it fastened together. However, this function is performed by the present invention in a totally unique manner. According to the present invention, a connecting rod of a heat contractible material, preferably the memory alloy known as 55-Nitinol, replaces the complex assembly of elements making up a conventional launch lock. Conventional elements which may be eliminated by use of the invention include single or redundant bolt cutter blades, squibs, springs, and the elements for catching and absorbing the shock of severed bolt segments.

The heat contractible connecting rod of the invention is often referred to herein as the "transductor".

The body of the transductor serves as an elongated bolt member which, upon being heated, is capable of changing rapidly from a locking length to a contracted length substantially smaller or shorter than the locking length so as to disengage a mating portion of the bolt member securing together two separable pieces of a fastening device.

Where the heat contractible material is Nitinol, preferably 55-Nitinol, the transductor is given a shape memory of its contracted length by heating a Nitinol rod of this length to about 900° F. and then annealing this rod by maintaining this temperature for about an hour followed by slowly cooling the rod over several hours. After the rod is cooled below the transition temperature of the 55-Nitinol material, preferably to ambient temperature (about 70° F.), it is deformed by stretching it to its locking length which is about 8% longer than its contracted length. A strain or deformation of about 8% is the maximum that will allow a complete recovery of the "memory" shape.

The deformed rod is then mounted in a housing from which about 8% or more of the overall locking length projects so as to lockingly engage two separable pieces. A heater is also mounted in the housing and concentrically surrounds a major housed portion of the deformed rod which will now serve as the transductor of the invention. The heater is connected to an electrical circuit and upon actuation of this circuit the transductor is heated to 0°–50° F., preferably 20°–40° F., above the transition temperature range of the 55-Nitinol material. The Nitinol composition is chosen so that this transition temperature range is preferably about 280°–320° F., more preferably about 290°–310° F. As the rod passes through the transition temperature range, it withdraws from engagement with at least one of the separable pieces, thus freeing the two pieces for movement relative to each other. The withdrawal force available is quite large due to the availability of an internal transition stress of about 80,000 psi as the transductor contracts from its locking length to its contracted length.

A characteristic of memory alloys such as 55-Nitinol, is that the rod retains its contracted length upon being cooled back to ambient temperature. Accordingly, the releasing function provided by the locking mechanism of the present invention is actuatable only as a one time operation that is not repeatable unless the transductor is removed from the launch lock and redeformed by stretching it back to its locking length.

The transductor may be characterized as an elongated member capable of changing from a locking length to a contracted length substantially smaller than the locking length upon the application of a sufficient amount of heat to cause contraction of the heat contractible material from which the elongated member is made. The elongated member may have a variety of cross-sectional shapes, such as circular, oval or rectangular.

Some of the important features of the locking mechanism of the invention are summarized below. A rod of heat contractible material is carried as a transductor in a housing mounted on one of two separable pieces and has a mating portion projecting from the housing so as to engage a recess or other engaging means on the other of the separable pieces to secure the two separable pieces together as a unitary load path structure. The two separable pieces in combination with the locking mechanism thus form a fastening device for securing together two or more components connected respectively to the two separable pieces. The housing or other means for mounting the transductor on one of the separable pieces is arranged such that the mating portion of the transductor is engaged by the engaging means to lockingly fasten together the two separable pieces only when the transductor has its locking length. Thus, this arrangement is such that the mating portion of the transductor is disengaged from the engaging means to allow the two separable pieces to be separated when the transductor has its contracted length. Also mounted in the housing is an electrically heating coil or other heating means for heating a major portion, preferably 92% and more preferably 95%, of the elongated member so as to cause it to change from its locking length to its contracted length.

The heating means preferably includes an electrical heating element, a supply of electrical energy and means for connecting the energy supply to the heating element in response to a signal generated at a location remote from the heating element. The energy connecting means may comprise electrical wires and a solenoid operated switch activated by an electrical relay which in turn may be responsive to a radio or microwave signal transmitted from a station remote from the vehicle or other apparatus containing the locking mechanism of the invention.

The transductor is fixedly secured at one end to the housing so that the other end may provide the mating portion. In this arrangement, a heating means comprising a heating coil preferably surrounds the intermediate portion of the transductor between its fixed end and its mating portion end.

The transductor is made at least in part by the memory alloy, preferably in the form of a cylindrical bar of 55-Nitinol. It is not required that the entire length of the bar be made of 55-Nitinol. However, it is preferred that at least a major portion of the axial length of the bar be made of this alloy and that this major portion serve as the intermediate portion of the transductor surrounded by the heating coil. Most preferably the entire length of the bar is made of 55-Nitinol.

55-Nitinol is a nickel-titanium alloy consisting essentially of 55% nickel and 45% titanium. In about 1962, it was discovered at the United States Naval Ordinance Laboratory that Nitinol has a property called shape memory. This property is such that a bar constructed of this alloy can be stretched or otherwise deformed relatively easily and if heated above its "transition temperature" range, the bar will resume a predeformed shape or configuration established by annealing the bar above its transition temperature range. The transition temperature range is defined by those temperatures over which Nitinol undergoes a thermally induced atomic shear transformation. The temperatures over which this transformation occurs is established by the exact composition of the memory alloy. It has been found that the 55-Nitinol composition has particularly effective shape memorization properties. Once the composition of the alloy is selected, the transition temperature range is defined substantially exactly.

Once an elongated Nitinol bar returns to its contracted length upon being heated, it will not by itself return to its locking length upon being cooled to ambient temperature. In other words, repetition of the locking length can be achieved only by a further deformation of the bar from its contracted length to its locking length. This is advantageous in that once the projecting or mating portion of the bar is withdrawn, it remains retracted in a position that is out of the way of the relative motion of the previously locked components.

Further information concerning the fabrication and annealing of 55-Nitinol is available from a publication entitled "55-Nitinol - The Alloy with a Memory; Its Physical Metallurgy, Properties and Application" NA-SASP5110, 1972, authored by C. M. Jackson, H. J. Wagner and R. J. Wasileski. The entire contents of this publication are expressly incorporated herein by reference.

The engaging means on the opposite separable piece for engaging the mating portion of the transductor preferably comprises an axially extending recess in this piece or in a stop element mounted thereon. The recess is arranged to axially receive the mating portion of the elongated body of the transductor. This recess preferably has substantially the same cross-sectional shape as the mating portion of the transductor, but is slightly larger in cross-sectional size than the mating portion to provide sufficient clearance for insertion and withdrawal of the mating portion relative to the walls of the recess. Either or both of the separable pieces of the fastening device may be acted on by a biasing means, such as a spring, for providing a biasing force to cause rapid separation of the separable pieces once they are released from the locking engagement provided by the mating portion of the locking mechanism. Thus, the biasing means engages at least one of the separable pieces so that this engaged separable piece is biased toward a separated or open position by the biasing force.

For example, one of the two separable pieces may be mounted on a base and a spring biasing means may extend between this base and the separable piece mounted thereon. This mounting arrangement may include a pivotally mounting connection for securing the separable piece to the base, and a coil spring arranged on a rod or pin so as to be compressed between the base and the pivotally mounted piece when the mating portion of the transductor is engaged in the recess of the engaging means on the other separable piece. Thus, one of the separable pieces may comprise a lever pivotally mounted on a base and the biasing means may comprise a spring arranged so that its spring force acts against the base and engages the lever to bias it toward a separated position away from a first position in which the mating portion of the transducer carried by the lever is received in a corresponding recess formed in a projecting portion of the other piece.

The locking mechanism may comprise a plurality of transducers each with an elongated heat contractible body. For example, the locking mechanism may have two identical locking components each having a mating portion engaging a recess in a pair of engaging members, one corresponding to each locking component. The transducers, one in each locking component, may be axially aligned and heat contractible in opposite directions. When so arranged, the mating portions of the heat contractible transducers may extend toward each other or, alternately, may extend away from each other. Where the transducers extend away from each other they may be carried in a unitary housing. Where the transducers are mounted in the same housing, they may jointly utilize the same heating coil. Where they extend toward each other, the two transducers are preferably mounted in separate housings, each with its own heating coil, and engage a T-shaped engaging member carried by the other separable piece.

In all transducer embodiments, the locking mechanism may further include a second heating coil for each of the one or more transducers. The second heating coil preferably is connected to a second power supply by an independent electrical system to provide a redundant heating system in case one of the heating systems fails, such as after or during the launch of a space vehicle using the locking mechanism.

While the heating means preferably comprises an electrical heating coil, other heating means may be used such as those providing combustion heat or heat from a chemical reaction. Regardless of the type of heating means, it is preferably arranged closely adjacent to and surrounding a major portion of the length of the elongated transducer body. Where there is more than one transducer and the heating means is an electrical coil, each transducer may have a separate heating coil that is connected to the same or to different power supplies. Multiple heating coils for multiple transducers may be connected either in parallel or in series. In the latter case, a subsequent heating coil may be considered an extension of the first heating coil. Where a single housing is used for more than one transducer, only a single heating coil may be provided for the plural transducers.

The advantages of the present invention over prior art launch locks are numerous. The 55-Nitinol rod forming the body of the transducer withdraws from its locking to its unlocking position with tremendous force, which may be as much as 80,000 psi. Thus, the two pieces locked together by the locking mechanism can be freed even when there is significant binding between the mating portion of the transducer and the walls of the recess that it engages.

The size and weight of the launch lock is considerably reduced with the present invention because of its use of a single active component (the transducer) which replaces multiple components of prior art launch locks. Furthermore, the contraction of this single active component involves a simple linear motion with an extremely small likelihood of failure so that the reliability of the locking mechanism is significantly increased. The components of the locking mechanism also are extremely rugged and sturdy so that there is little likelihood of structural failure of a component due to the high random forces and stresses transmitted along load-paths during launch of a spacecraft. Reliability is extremely important in spacecraft applications of launch locks because as many as 12 or more locks may be employed and a single failure of any one of these may result in a total loss of the utility of the spacecraft. In addition, the reduction in overall weight of the locking mechanism is especially important because its lower weight translates into very considerable savings in launch costs, of which spacecraft weight is a prime determinant.

Although the present invention has been described primarily in regard to the space age locking mechanisms known as "launch locks" for application in spacecraft, the teachings of the invention are applicable to any locking mechanism for fastening together two separable pieces. For example, the locking mechanism may find application in any of a great number of safety devices for vehicles, such as fire release mechanisms for extinguishing fires in aircraft, automobiles, boats and other vehicles. The locking mechanism also may find utility in other types of fire protection equipment requiring release of one piece from another to actuate an alarm or the application of a fire extinguishing substance.

Other objects and advantages of the invention may become apparent from the description below of the preferred embodiments.

BRIEF DESCRIPTION OF THE DRAWINGS

The invention and its preferred embodiments may be understood further with reference to the accompanying drawings, in which:

FIG. 5 is a front elevational view in partial section showing a modification of the locking mechanism of the invention;

FIG. 6 is a side elevational view of a further modification of the invention in its locked position; and, FIG. 7 is a side elevational view showing the modification of FIG. 6 in its unlocked position.

DESCRIPTION OF PREFERRED EMBODIMENTS

Figure 1:
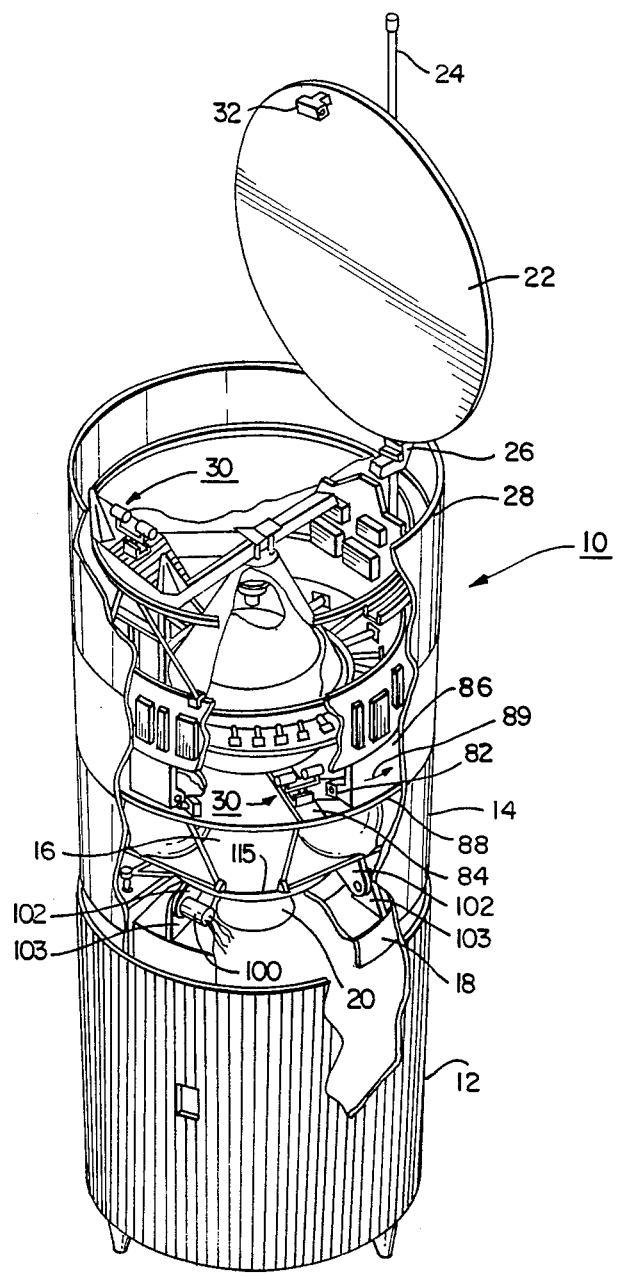
FIG. 1 is a perspective view in partial section of a spacecraft showing three different applications of a locking mechanism according to the invention.

Referring to FIG. 1 of the drawings, a spacecraft 10 has an aft solar panel section 12 and a forward self-propelled module 14 having mounted therein a rocket motor 16. A thermal barrier 18 protects aft solar panel 12 and other sensitive units from the hot gases discharged from nozzle 20 during adjustment maneuvers requiring operation of the rocket motor. At the forward end of module 14 is a deployable reflector 22 carrying an antenna 24. Reflector 22 is mounted on module 14 by a spring loaded pivotal connection 26.

During launch of the spacecraft 10, the reflector dish 22 and antenna 24 are locked in a retracted position within the upper end 28 of module 14 by means of a launch lock according to the invention and generally designated 30. The launch lock 30 includes a pair of locking components 34—34 detachably bolted to a pair of cradle members 35—35 as shown best in FIG. 4. The components 34—34 engage a T-shaped member 32 rigidly fastened to the inside of reflector dish 22 near its outer periphery opposite to pivotal connection 26, which contains a motor element (not shown) for causing the dish 22 to pivot to its open position shown in FIG. 1 upon release of the T-member 32 from the locking components 34—34 as described further below.

Figure 3:
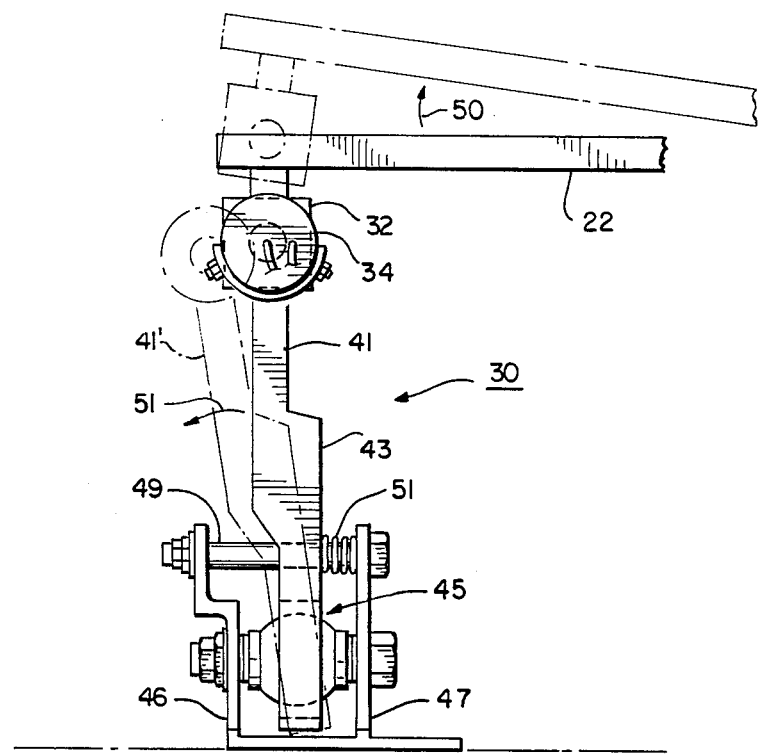
FIG. 3 is a side elevational view of a fastening device employing the locking mechanism of the invention.
Figure 4:
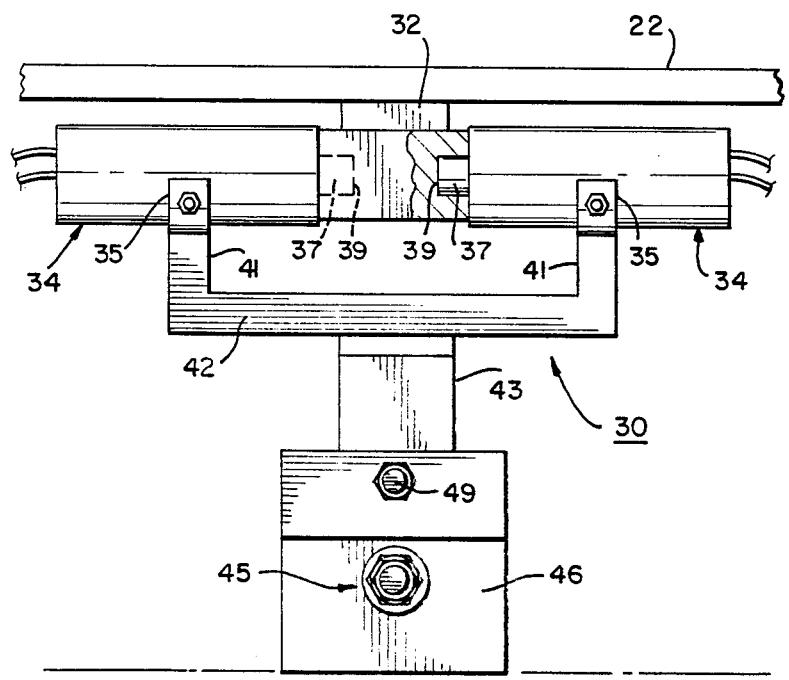
FIG. 4 is a front elevational view in partial section of the fastening device and locking mechanism of FIG. 3.

In its locking condition, each component 34 has a transductor 36 with a retractable mating portion 37 for engaging a corresponding recess 39 in an arm of T-shaped member 32 as shown best in FIG. 4. Locking components 34—34 are each carried on corresponding arms 41—41 of a U-shaped member 42 connected at its base to a lever 43. As shown best in FIG. 3, lever 43 is mounted for pivotal movement by a ball joint 45 mounted between opposing brackets 46 and 47 providing a base for the locking mechanism. Also extending between brackets 46 and 47 is a rod 49 on which is mounted a coil spring 51 for providing a spring force to bias lever 41 toward a released position 41' shown by broken lines. Upon contraction of the transductors 36—36 as described below with reference to FIG. 2, projecting ends 37—37 retract from recesses 39—39 thereby freeing T-member 32 from locking engagement with locking components 34—34. When T-member 32 is freed, lever 41 moves to its unlocked position 41' in response to the biasing force of coil spring 51 and reflector dish 22 pivots in the direction of arrow 50 from its launch locked position of FIG. 3 to its open or deployed position of FIG. 1.

Figure 2:
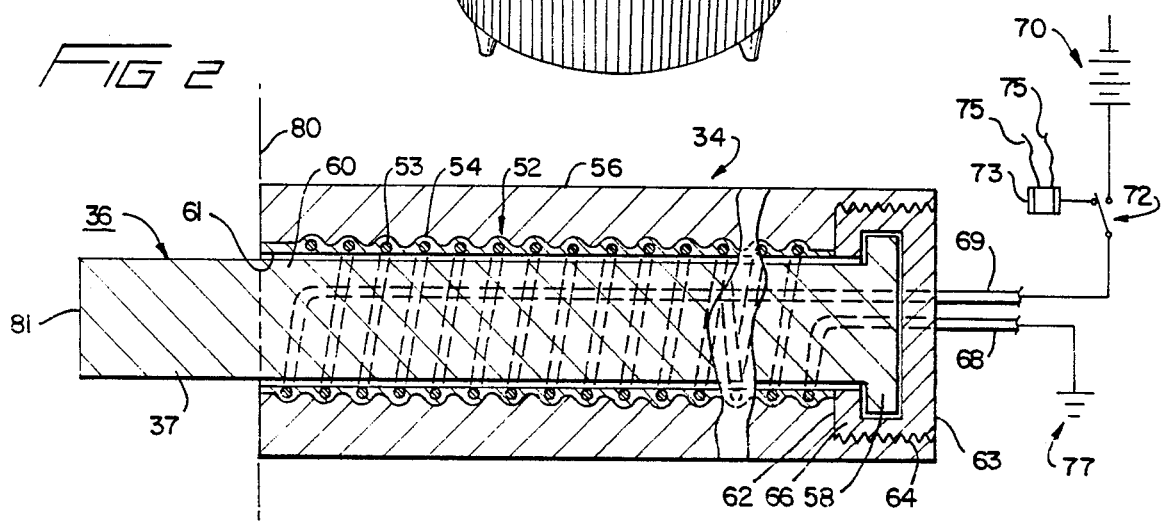
FIG. 2 is a longitudinal cross-sectional view of the transducer and actuator components of the invention.

With reference to FIG. 2, each locking component 34 includes a transductor 36 having a major portion of its length, preferably about 90% and more preferably about 95%, surrounded by a heating coil 52. The heating coil 52 preferably comprises coils of resistance wire 53 embedded within a ceramic and electrically insulating material 54. Heating coil 52 is preferably enclosed within a housing 56 which may be made either of metal or of a heat insulating plastic material. The transductor 36 is the form of an elongated bolt or rod having a projecting portion 37 and a head 58 of larger diameter than a bolt shaft 60. Bolt shaft 60 extends longitudinally along a bore 61 within housing 56. Bolt head 58 is secured within a chamber 62 within housing 56 by means of a plug 63 which is threaded at 64 to engage corresponding threads in the radial wall of recess 62. Threaded plug 63 also has an allen wrench socket, which is not shown for reasons of clarity, to permit installation and removal of the transductor. A lock washer 66 is preferably provided to further secure plug 63 and bolt head 58 in the seat for these elements provided by chamber 62.

Heating coil 52 is connected externally of housing 56 to a source of electrical power through external wires 68 and 69. The source of electrical power may be a battery 70 connected to line 69 through a switch 72 which is preferably operated remotely through a solenoid 73 connected to a radio operated relay (not shown) by wires 75—75. The opposite end of heating coil 52 is connected to ground 77 through line 68. The relay and related control system (not shown) connected to solenoid operated switch 72 allow actuation of the heating coil by a radio or microwave signal from a location remote to the spacecraft, such as a ground control or communication station appropriately positioned on the surface of the earth in relation to the orbit of the spacecraft.

The transductor 36 is preferably made from a heat contractible material, such as an alloy consisting essentially of a mixture of about 55% nickel and about 45% titanium and known as 55-Nitinol. Such a heat contractible alloy or other material is a particularly important feature of the present invention.

An important aspect of Nitinol (particularly the 55% nickel and 45% titanium composition) is that it retains a "memory" of a physical shape imparted to it at or above a special annealing temperature $T_a$. Nitinol was developed by the United States Naval Ordinance Laboratory and its memory is caused by a thermally induced atomic shear transformation which occurs when Nitinol is heated from a temperature $T_1$ below its transition temperature $T_t$ to a temperature $T_2$ above $T_t$. Thus, $T_1$ is less than $T_t$ and $T_2$ is greater than $T_t$ but less than $T_a$. The memory property of Nitinol is such that the annealed geometric shape of this material can be thermally induced to reoccur in spite of subsequent deformations of this shape equal to or less than about an 8% strain imposed at a temperature lower than $T_t$ such as $T_1$.

The Nitinol used for constructing the body of transductor 36 has an annealing temperature $(T_a)$ of about 900° F. and a transition temperature $(T_t)$ of about 300° F. However, the transition temperature at which there are restoring stresses for achieving the "remembered" shape is not sharply defined such that $T_t$ actually comprises a temperature range of approximately 20° F. Over this temperature range $T_t$, the restoring stresses increase from 0 to about 80,000 psi, depending on the resistance encountered to such restoration.

According to one example of the invention, the transductor 36 is made from a rod having a shaft about 10 inches long and 0.5 inches in diameter. This rod includes a head 58 with an axial thickness of about ¼ inch and a outside diameter of about 0.8 inches. The length of the shaft is exclusive of the thickness of head 58. This rod retains these dimensions while being annealed at 900° F. The annealing process involves maintaining the temperature of the rod at about 900° F. for about 1 hour and then slowly cooling the elongated member over a period of 1 to 2 hours before reaching a temperature below the transition temperature. This annealing process provides a temperature above the transition temperature for a time sufficient to impart the desired memory of the contracted length to the elongated member. After the rod is cooled to an ambient temperature of $T_1$, its shaft is mechanically stretched to a length of about 10.8 inches for a maximum strain equal to or less than 8%. The resulting rod is then installed as the transductor 36 in the housing 56 of locking component 34. The rod processed in this fashion will then change from its locking length to its contracted length upon being heated to a temperature somewhat above its transition temperature range of about 290°-310° F. The heat activating temperature is preferably about 320°-360° F., more preferably about 330°-350° F. The temperature differential between the upper end of the transition temperature range and the actuation temperature provided by the heating coil affects the rate of contraction of the transductor rod. This temperature differential is selected to provide a relatively rapid contraction rate. This rate is sufficient to cause release of the two separable pieces preferably in less than about one-half minute, more preferably within about 15 seconds, and most preferably within about 10 seconds of the time at which the rod substantially reaches the actuation temperature. The heating coil and its power supply are chosen so as to bring the rod to this actuation temperature at a relatively rapid heat-up rate, preferably in less than about one-half minute, more preferably within about 15 seconds, and most preferably within about 10 seconds of the time at which the heating coil is initially actuated by connecting it to the power supply.

The locking mechanism of the present invention operates as follows. When the mechanically stretched rod shaft 60 is installed in the housing 56, its length is sufficient to provide a projection 37 extending well beyond a separation plane represented by the imaginary line 80 in FIG. 2. This projection fits within the recess 39 of T-member 32 so as to retain the reflector dish 22 in its locked position within end 28 of module 14. This locked position is represented by the solid lines of the reflector 22 in FIG. 3.

When the reflector dish 22 and antenna 24 attached thereto are to be deployed, a radio signal is sent to the spacecraft to close switch 72 and thereby provide electrical power to heating coil 52. The heating coil then heats transductor 36 to a temperature $T_2$ of about 350° F. As the temperature of the transductor body passes through the range of the transition temperature $T^t$ of about 290°-310° F., transductor 36 commences to seek its "remembered" shape, which has a length of only 10 inches. The shaft 36 thereupon contracts to its memory shape of 10 inches with a force, if resisted, of as much as 80,000 psi. The contraction of the transductor material thereby causes the outer end 81 of projection 37 to be retracted inward substantially past the separation plane 80 of FIG. 2. This retraction of the mating portions 37—37 from the recesses 39—39 of the T-shaped member 32 of FIGS. 3 and 4 releases the engagement between lever 41 and reflector dish 22, whereupon the reflector dish pivots to its open position under the action of the motor in pivotal joint 26. At the same time, lever 41 pivots to its released position 41' under the action of coil spring 51.

The pivotal motion of lever 41 is particularly helpful in releasing a T-shaped member 82 from a locking mechanism 30 installed on a stationary frame member 84 within module 14. The T-shaped member or stop 82 is mounted on an equipment shelf 86 which spins within module 14 supported by a bearing 88. Since shelf 86 rotates in the direction of arrow 89, the locking components 34—34 must move laterally in the direction of arrow 51 (FIG. 3) to a released position that is clear of the rotational path of the T-shaped member 82 carried by the spinning equipment shelf 86.

Additional embodiments of the invention are shown in FIGS. 5, 6 and 7. The same part numbers are used in FIGS. 5, 6 and 7 for the same elements as shown in FIG. 2. In FIG. 5, the T-shaped member 32 has been replaced by a pair of ears 91—91 depending from reflector dish 22. Each ear includes a recess 92 for receiving the projecting end portion 37 of a corresponding transductor 36. Each ear 91 includes a threaded detachable joint 93 to facilitate assembly of the locking mechanism with the mating portions 37—37 of the transductors projection outward beyond the housing 94.

A single housing 94 is provided for housing the heating coils 52—52 and this housing has two identical sections 95—95. The heating coils 52—52, the transductors 36—36 and the locking washers 66—66 fit within corresponding bores and chambers within the housing sections 95—95 in the same manner as these elements fit within corresponding bores and chambers within the housing 56 of FIG. 2. The heads of the bolts 58—58 and the housing sections 95—95 are fastened in position by a unitary threaded plug 97 connecting sections 95—95.

Referring to FIGS. 6 and 7, there is shown a modification of the invention wherein a single locking component 100 is provided for fastening together two separable members 102 and 103. In this embodiment, the projecting portion 37 of the transductor 36 passes through an aperture 104 in piece 102 and then aperture 105 in piece 103 so as to fasten these two separable pieces together until such time as the locking component is actuated by providing an electrical current to one or both of a pair of coils 107 and 108. This actuates the transductor 36 so as to permit separation of piece 103 from piece 102 along a separation plane 114. The redundant coils 107 and 108 may be helically wound adjacent to each other or concentrically wound one on top of the other, the former being preferred. The coil 107 is connected to an electrical power supply by lines 110 and 111 using a battery and connecting circuit similar to that shown in FIG. 2. The coil 108 is connected by lines 112 and 113 to a second electrical power supply, which may be a second battery, by an electrical circuit also similar to that shown in FIG. 2. In this embodiment, the electrical wires of the separate solenoid switches, one for each coil 107 and 108, preferably are connected to different remotely actuatable relays so as to provide a completely redundant back-up heating system for actuation of the launch lock should there be a failure in the electrical system for actuating coil 107, in the electrical system for actuating coil 108, or in one of these coils.

Referring to FIG. 7, actuation of the locking component 100 causes contraction of the locking transductor so as to withdraw the projecting portion 37 from the aperture 105 in piece 103. The contraction of transductor 36 upon actuation of one or both of the heating coils 107 and 108 thus allows the two pieces 102 and 103 to be separated as illustrated in FIG. 7.

What is claimed is:

1. A locking apparatus for securing together two separable pieces of a fastening device, said locking apparatus comprising:

an elongated member of heat contractible material capable of changing from a locking length to a contracted length substantially smaller than said locking length upon an application of heat to said elongated member sufficient to cause contraction of said heat contractible material;

engaging means on one of said separable pieces for engaging a mating portion of said elongated member;

means for mounting said elongated member on the other of said separable pieces such that the mating portion of said elongated member is engaged by said engaging means to lockingly fasten together said separable pieces when said elongated member has said locking length, and such that the mating portion of said elongated member is disengaged from said engaging means to allow said two pieces to be separated when said elongated member has said contracted length; and, means for heating said elongated member so as to cause said elongated member to change from said locking length to said contracted length.

2. A locking apparatus according to claim 1 in which said heating means includes an electrical heating element, a supply of electrical energy, and means for connecting said energy supply to said heating element in response to a signal generated at a location remote from said locking apparatus.

3. A locking apparatus according to claim 1 in which said heat contractible material comprises a memory alloy, said elongated member is fixedly secured at one end to said other separable piece by said mounting means and the other end of said elongated member comprises said mating portion, and said heating means comprises a heating coil surrounding an intermediate portion of said elongated member.

4. A locking apparatus according to claim 3 in which said elongated member comprises a bar of 55-Nitinol and said intermediate portion of the elongated member comprises a major portion of the axial length of said bar.

5. A locking apparatus according to claim 4 in which said intermediate portion comprises at least 90% of the axial length of said bar.

6. A locking apparatus according to claim 1 in which said engaging means comprises an axially extending recess arranged to axially receive the mating portion of said elongated member, said mating portion and said recess having substantially the same cross-sectional shape.

7. A locking apparatus according to claim 1 in which said elongated member comprises a bar consisting essentially of a 55-Nitinol alloy which has been annealed while having said contracted length and while at a temperature above the transition temperature range of said alloy for a time sufficient to impart to said bar the memory of said contracted length, and which, after said annealing, has been mechanically stretched to said locking length at a temperature below said transition temperature range; and in which said heating means includes means for heating said bar to a temperature above said transition temperature range so as to cause the length of said bar to contract from said locking length to said contracted length.

8. A locking apparatus according to claim 1 which further includes biasing means for providing a biasing force, and in which said biasing means engages at least one of said separable pieces such that said separable piece is biased toward a separated position by said biasing force.

9. A locking apparatus according to claim 8 in which one of said two separable pieces is movably mounted on a base, and said biasing means extends between said base and said one of said separable pieces.

10. A locking apparatus according to claim 9 in which said one separable piece is pivotally mounted on said base and said biasing means comprises a spring arranged to be tensioned by relative movement between said base and said one separable piece.

11. A locking apparatus according to claim 10 in which said one separable member comprises a lever pivotally mounted on said base, and in which said spring comprises a coil spring having a compression spring force and arranged to act against said base and to engage said lever so that said spring force biases said lever toward said separated position and away from a first position at which a mating portion of said elongated member is engaged by said engaging means.

12. A locking apparatus according to claim 1 in which said already mentioned elongated member is a first member; in which said apparatus further includes a second elongated member of heat contractible material capable of changing from a locking length to a contracted length substantially smaller than said locking length upon application of sufficient heat to said second member to cause contraction of said heat contractible material, and second engaging means for engaging a mating portion of said second member; in which said mounting means includes means for mounting said second member on said other separable piece such that the mating portion of said second member is engaged by said second engaging means to lockingly fasten together said separable pieces when said first and second members each have their respective locking lengths, and such that the mating portion of said second member is disengaged from said engaging means to allow said two separable pieces to be separated when said first and second elongated members each have their respective contracted lengths; and, in which said heating means includes means for heating said second member so as to cause said second member to change from its locking length to its contracted length at substantially the same time as said first member is caused to change from its locking length to its contracted length by said heating means.

13. A locking apparatus according to claim 12 in which said first and second elongated members are axially aligned and are heat contractible in opposite directions.

14. A locking apparatus according to claim 13 in which said heating means comprises a first heating coil surrounding a major portion of said first elongated member and a second heating coil surrounding a major portion of said second elongated member.

15. A locking apparatus according to claim 13 in which the mating portions of said first and second heat contractible members extend toward each other.

16. A locking apparatus according to claim 13 in which the mating portions of said first and second heat contractible members extend away from each other.

17. A locking apparatus according to claim 14 in which said mounting means includes a housing, and in which said first and second heating coils and a major portion of said first and second elongated members are carried in said housing.

18. A locking apparatus according to claim 17 in which said first heating coil is connected in series with said second heating coil.

19. A locking apparatus according to claim 14 in which said mounting means includes a first housing and a second housing, and in which said first heating coil and a major portion of said first elongated member are carried in said first housing and said second heating coil and a major portion of said second elongated member are carried in said second housing.

20. A locking apparatus according to claim 1 in which said heating means includes a first heating coil and a second heating coil, means for connecting said first heating coil to a first power supply, and means for connecting said second heating coil to a second power supply.

* * * * *